Nov. 17, 1970  T. M. TRUMBLE  3,541,539
INTEGRATED FIRE AND OVERHEAT DETECTION SYSTEM
FOR MANNED FLIGHT VEHICLES
Filed Nov. 29, 1968  5 Sheets-Sheet 1

INVENTOR.
TERRY M. TRUMBLE
BY Harry A. Herbert Jr
Robert Kern Duncan and
ATTORNEYS INVENTOR.
TERRY M. TRUMBLE
BY Harry A. Herbert Jr
Robert Kern Duncan
ATTORNEYS

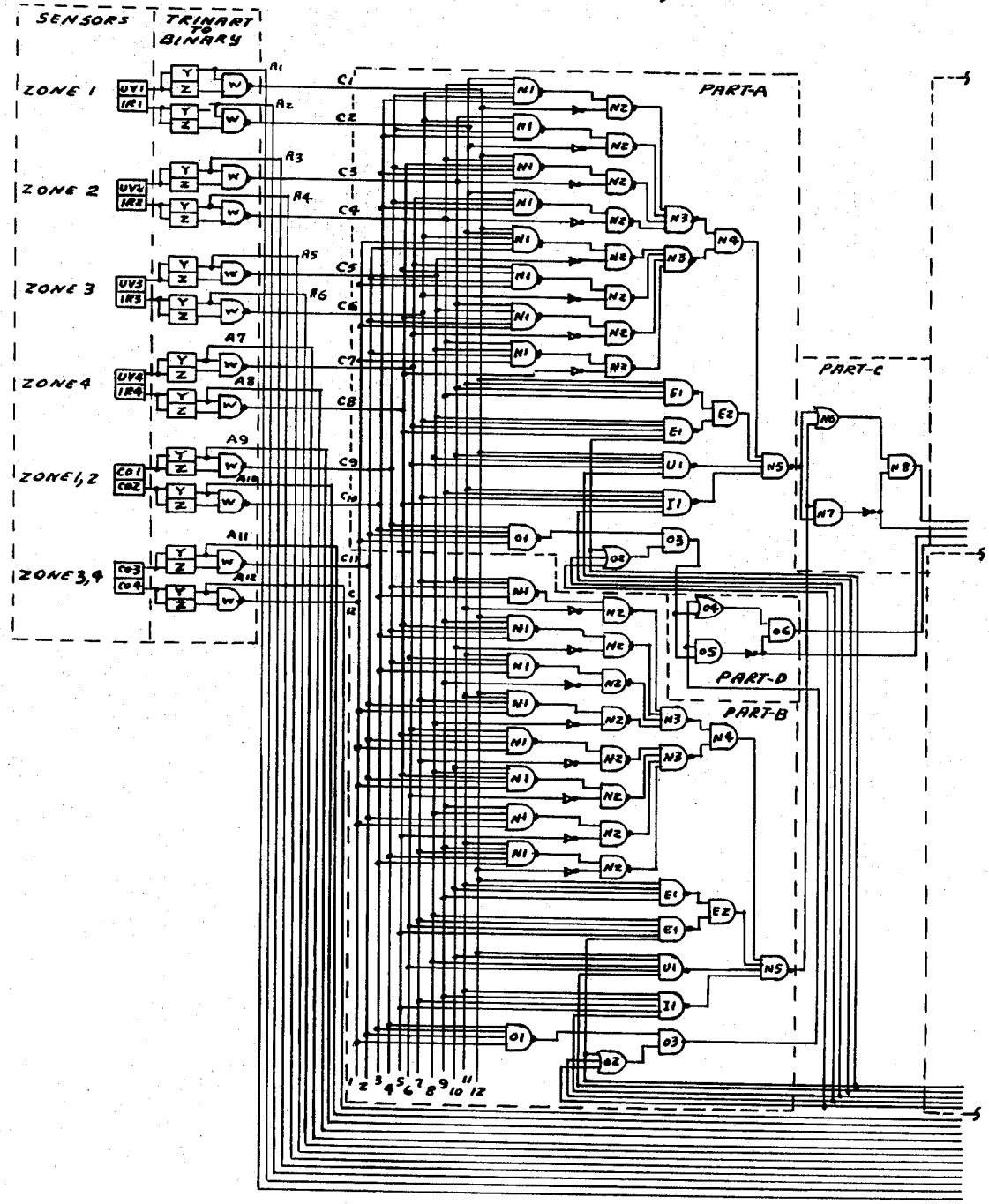
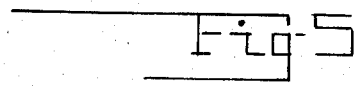
Fig 5 (PART-1)

3,541,539
INTEGRATED FIRE AND OVERHEAT DETECTION
SYSTEM FOR MANNED FLIGHT VEHICLES
Terry M. Trumble, Dayton, Ohio, assignor to the United
States of America as represented by the Secretary of
the Air Force
Filed Nov. 29, 1968, Ser. No. 779,911
Int. Cl. B64d 37/32
U.S. Cl. 340—227                                    4 Claims

ABSTRACT OF THE DISCLOSURE

Fire or overheat is detected in an aircraft engine nacelle by integrating 12 sensors, 4 infrared and 4 ultraviolet for fire, and 4 continuous element sensors for overheat. A microcircuit digital fail safe two channel comparison type computer having the five selectable modes of NORMAL, EMERGENCY, ULTRAVIOLET, INFRARED, and CONTINUOUS, integrates continuously the signals from all 12 sensors such that redundant coverage by two or more sensors can detect and verify either a fire or overheat. Six sensors can fail in the normal mode and eight in the emergency mode without the system failing.

BACKGROUND OF THE INVENTION

The field of this invention is in the art of fire and overheat monitoring and indicating systems for aircraft engine nacelles.

Prior art devices in this field extend back to the early concepts of fire detection devices which were simple eutectic alloys that melted from the heat of a fire. The lack of reset capability, poor inherent sensitivity, and point sensing instead of volume or area sensing resulted in poor operational systems. Between one and two decades ago the bimetallic switch and the rate of rise thermocouple came into extensive use, and shortly after the continuous-element overheat sensor capable of much greater coverage than that of previous sensors was developed. This later device, sensitive to heat at all points along its length, was later improved to delineate between fire or overheat by the use of rate of rise discrimination. More recently infrared and ultraviolet sensors have been developed. All the currently operational types of sensors and their associated systems have improved performance and capability but the complexities and multiplicity of many independent systems coupled with their low reliability characteristics have reduced the confidence that aircrew members put in the fire detection system. In the present state of the art systems many false alarms appear. Thus, when an alarm appears, false or not, standard procedures for shutdown are followed, except during critical maneuvers. This particular problem has caused some current detection systems to be considered as more of a nuisance than a help. The permanent removal of the complete fire detecting system from operational aircraft has taken place repudiating the adage "some fire detection is better than none at all." The servicing of these current state of the art systems to correct faults also frequently demands extensive aircraft down time at crucial times in their schedules. This is due primarily to the lack of redundance in the systems and the lack of provision for alternate sensing modes.

SUMMARY OF THE INVENTION

The conditions of fire, overheat, and failure, are detected in a defined location by a plurality of infrared, ultraviolet, and iterative thermocouple sensors. Outputs in binary functions representing these three conditions activate a fail safe two channel comparison type digital computer to provide in five selective modes the readouts of "FIRE," "OVERHEAT," "OK," and "FAIL."

BRIEF DESCRIPTION OF THE DRAWING

FIGS. 5, 5a and 5b is a block diagram in symbolic logic notation of an embodiment of the invention.

DESCRIPTION OF THE PREFERRED EMBODIMENT

Figure 1:
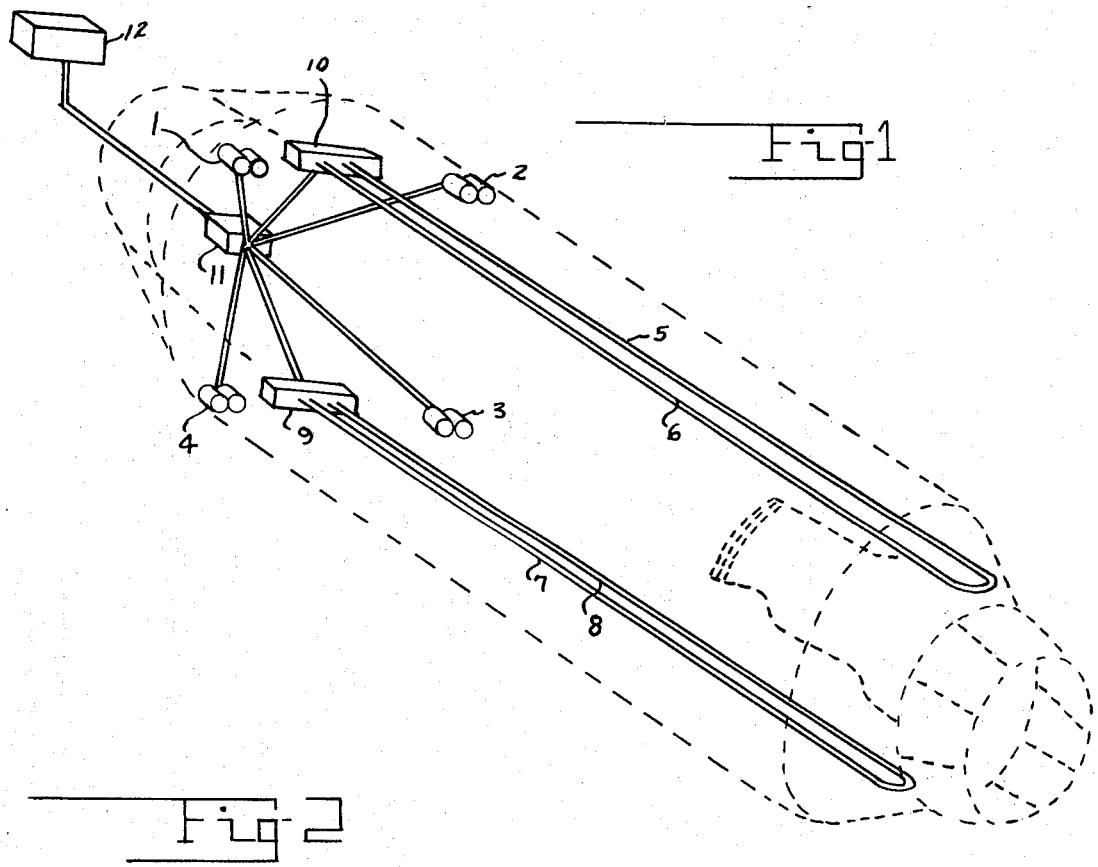
FIG. 1 is a pictorial representation of an embodiment of the invention.

FIG. 1 shows a typical installation of an embodiment of the invention in a jet engine nacelle. The paired infrared and ultraviolet sensors 1, 2, 3, and 4 have overlapping zones of field of view. Thus a fire seen by sensors 1 will also be seen by either or both sensors 2 and 4, but generally not by 3 due to the intervening presence of the engine. The continuous heat sensing elements 5 and 6 sense temperature rises in the zones monitored optically by sensors 1 and 2 and likewise heat sensors 7 and 8 are in the zones of 3 and 4. The terminals for the heat sensors are located in junction boxes 9 and 10. The outputs from all the sensors, which are control voltages and associated direct currents, are conducted to a microcircuit computer 11 which converts the three values of current flows from the sensors representing "OK," "FIRE" (or "OVERHEAT"), or "FAIL" into binary logic and presents the readout of the appropriate condition to the aircraft crew on the indicator 12.

The ultraviolet and infrared optical sensors and the continuous element heat sensors are conventional units. In the particular embodiment being described they are photovoltaic and thermopile units with a nominal output of essentially zero volts and an internal impedance of approximately 70 thousand ohms when subjected to the normal conditions in an engine nacelle. Under the conditions of fire or overheat their output is approximately 1.6 volts with approximately 30 microamperes of current flowing in their load circuits.

To add further discrimination to the infrared and ultraviolet photovoltaic units conventional optical filters may be used. In addition low pass filtering (such as a 20 hertz low pass filter) may be used with the infrared sensor to detect flame flicker.

Figure 2:
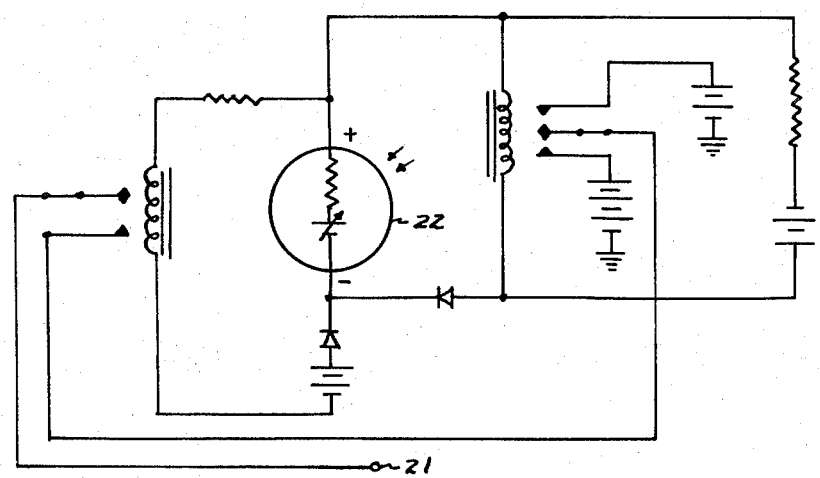
FIG. 2 is a schematic diagram of an embodiment of a sensing system circuit.

FIG. 2 is a schematic diagram of one embodiment of sensing circuitry suitable for providing the three outputs of FAIL, OK, and FIRE (or OVERHEAT) when used with the previously described sensors. The logic involved is to have three conditions of voltage at terminal 21 represent the three conditions to be sensed by sensing element 22. In this embodiment a voltage of 10 volts output at terminal 21 indicates the system is "OK." Five volts output indicates the condition of "FIRE" (with the fire sensors, or "OVERHEAT" with the heat sensors) and zero volts output indicates the condition of "FAIL." (Fail being the condition when the sensing element has become defective and incapable of providing an output of its own due to being open circuited.)

Figure 3:
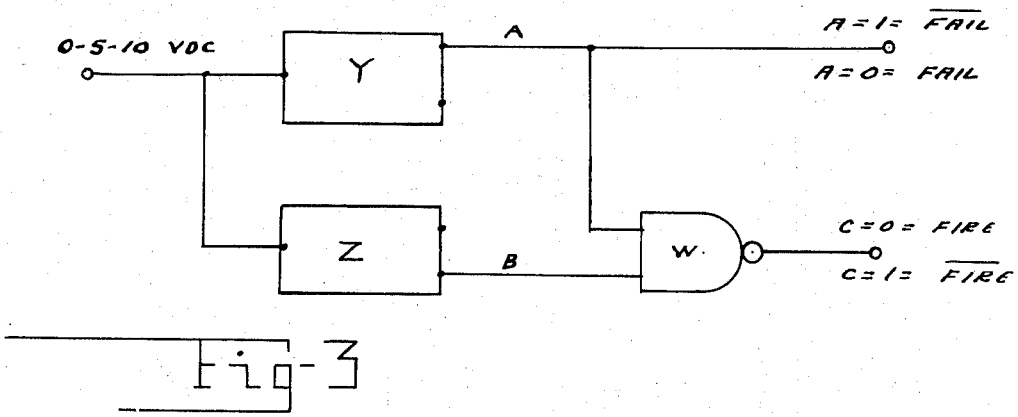
FIG. 3 is a block diagram of an embodiment of a trinary to binary converter.

In order to simplify the computer, this trinary signal (10, 5, and 0 volts) is converted to binary (0's and 1's) logic in the converter shown in block form in FIG. 3. Block Y is a modified monostable multivibrator (or a Schmitt trigger) with a nominal onset voltage of 5 volts. Block Z is also a modified monostable multivibrator (also may be a Schmitt trigger) but with a nominal 10 volt onset voltage. Block W is a conventional NAND gate. With an input of 10 volts both Y and Z are turned on. W is not turned on because a 1 is the input from Y but an inverted 1 (or zero) is the input from Z. This will not activate W, but since W is a NAND gate it will have an output of 1 which is $\overline{\text{FIRE}}$ (not fire—as is conventional, a word with a bar above it indicates inverting the meaning). Output A is a 1, which is $\overline{\text{FAIL}}$. (Not fail is used for OK.) Thus under the conditions of 10 volts input the system gives the indication of OK and that there is no fire present.

When a 5 volt signal is present at the input, only Y is turned on. Output A will be $\overline{\text{FAIL}}$ and output B into W will be a 1. With two 1 inputs to W, one each, respectively, from lines A and B, the output C will be a 0. A "0" at C means FIRE, and when present with a 1 from A output, the system is operating OK or $\overline{\text{FAIL}}$. Thus a fire is present. The final case is for 0 volt in. For this case the A output is 0 and the B output is 1. A 0 and a 1 input to W results in a 1 output. This states that A indicates FAIL and C indicates $\overline{\text{FIRE}}$. (In the complete system FAIL takes precedence and "FAIL" only is indicated.) The following table shows the conversion to binary (0's or 1's) logic from the trinary input by the trinary to binary converter.

TRINARY DECODER FOR COMPUTER INPUT SIGNALS

| Input volts | Output A | Output B | Output C | Literal meaning |
|---|---|---|---|---|
| 10 | 1 ($\overline{\text{FAIL}}$) | 0 | 1 ($\overline{\text{FIRE}}$) | Not Fire, Not Fail. |
| 5 | 1 ($\overline{\text{FAIL}}$) | 1 | 0 (FIRE) | Fire, Not Fail. |
| 0 | 0 (FAIL) | 1 | 1 ($\overline{\text{FIRE}}$) | Not Fire, Fail. |

Figure 4:
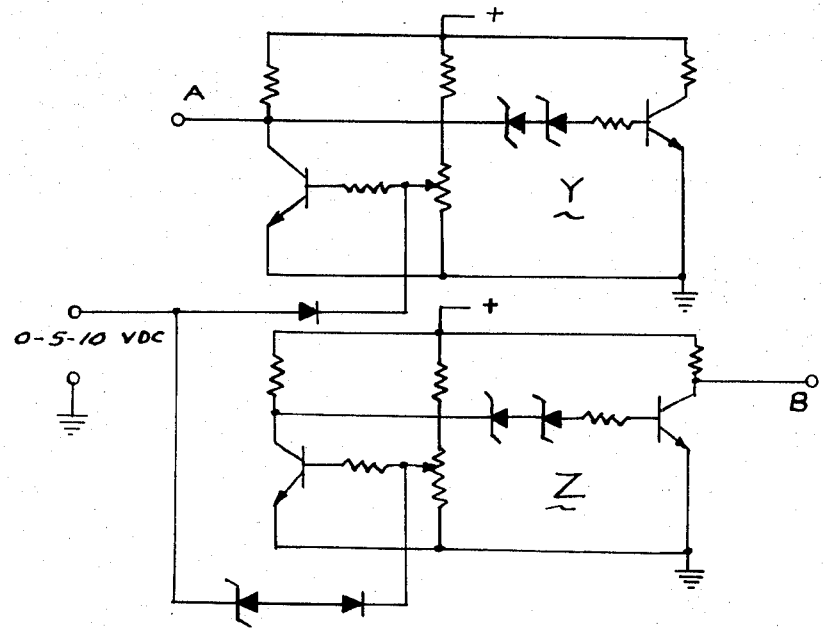
FIG. 4 is a schematic diagram of an embodiment of a trinary to binary converter.

The schematic diagram of an embodiment of the trinary to binary converter is shown in FIG. 4.

For a total of 12 trinary input signals to the computer (as the embodiment of this invention being detailed has), there are 24 binary equivalents. For clarity symbols have been assigned that will not become cumbersome during the Boolean expression phrase. The following table gives these assignments.

| Zone covered | Sensor | Fail channel | Fire channel |
|---|---|---|---|
| 1 | UV1 | $A_1$ | $C_1$ |
| 1 | IR1 | $A_2$ | $C_2$ |
| 2 | UV2 | $A_3$ | $C_3$ |
| 2 | IR2 | $A_4$ | $C_4$ |
| 3 | UV3 | $A_5$ | $C_5$ |
| 3 | IR3 | $A_6$ | $C_6$ |
| 4 | UV4 | $A_7$ | $C_7$ |
| 4 | IR4 | $A_8$ | $C_8$ |
| 1,2 | CONT 1 | $A_9$ | $C_9$ |
| 1,2 | CONT 2 | $A_{10}$ | $C_{10}$ |
| 3,4 | CONT 3 | $A_{11}$ | $C_{11}$ |
| 3,4 | CONT 4 | $A_{12}$ | $C_{12}$ |

Figure 5A:
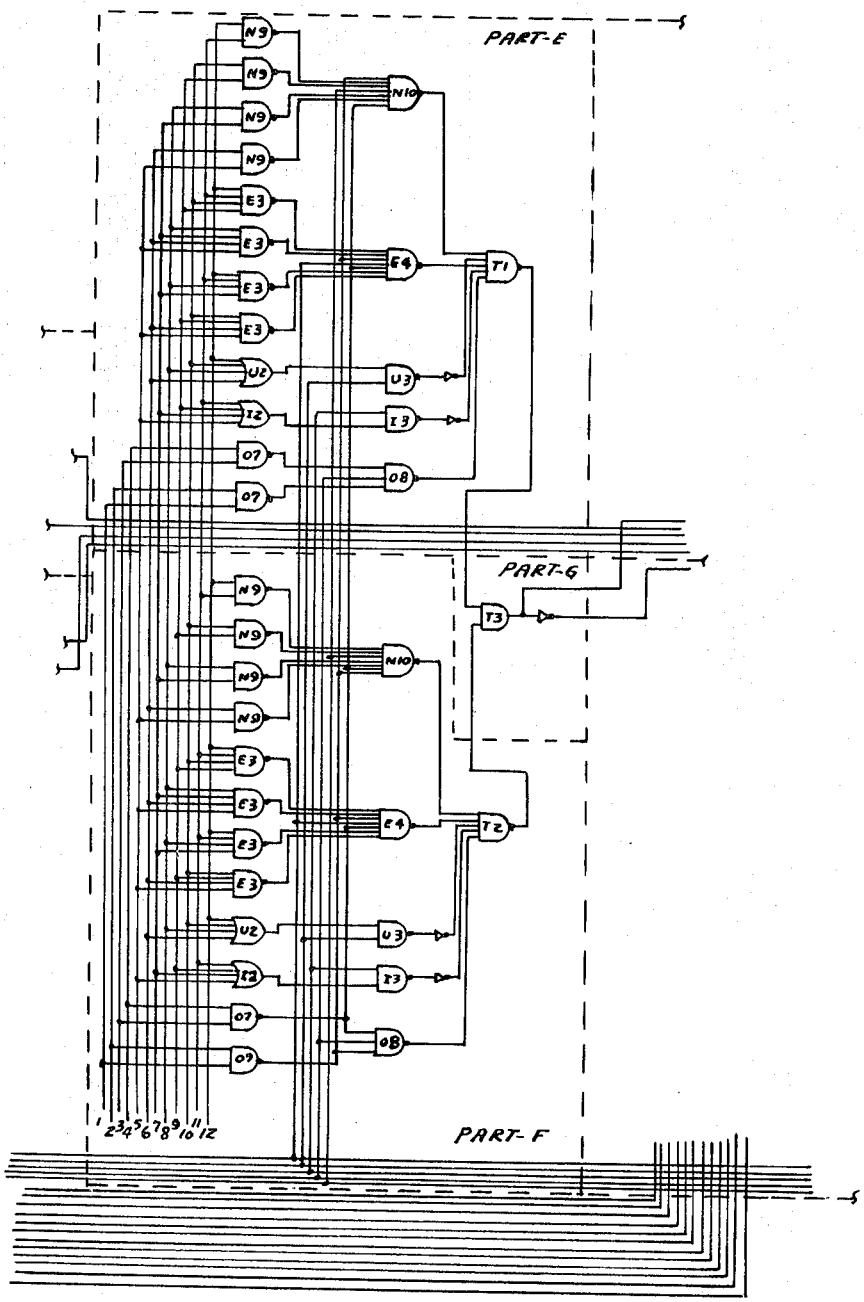
Figure 5B:
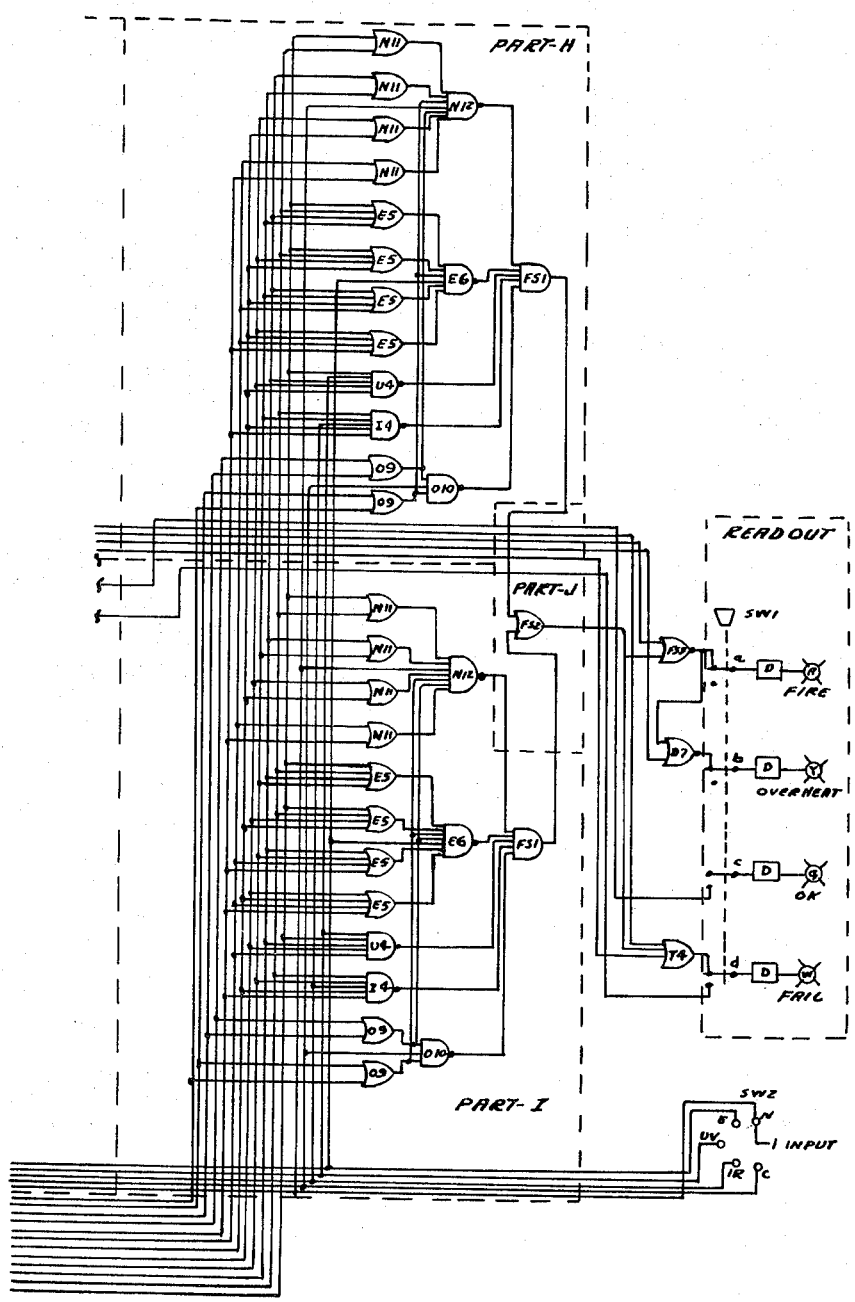

These 24 individual inputs in binary logic (1's and 0's) from the trinary to binary converter are shown on the overall schematic of this embodiment in FIGS. 5, 5a, and 5b.

Referring to FIGS. 5, 5a, and 5b, there are five modes of operation (NORMAL, EMERGENCY, FIRE UV, FIRE IR, and OVERHEAT). Each one has a separate position on the selector switch of the crew member's console. Each system is continuously monitored for FAIL and can be positively checked for FIRE or OVERHEAT by a forcing function or push-to-test switch. Readouts available for each of the five switch positions are FIRE, OVERHEAT, OK, and FAIL and apply as previously outlined. Redundancy is provided in the computer by duplicating major blocks of functions and analyzing them. For clarity all references will use the complete computer block diagram, FIGS. 5, 5a, 5b. Duplicated blocks are paired as follows: Part A and Part B, Part E and Part F, and Part H and Part I. The criteria for each of the five modes follows:

(a) Normal mode (N)

In this mode, a redundancy concept is used to provide a FIRE indication. This indication can occur only if the following set of circumstances prevail:

(1) This is a fire signal from at least two detectors with the same field or a mutual field of view.
(2) A system failure is not present.
(3) The push-to-test switch is not depressed. The logic for determining fire only without any other constraints is shown in the following equation:

$$\text{FIRE}_N = C_1(C_2 + C_9 + C_{10} + C_3 + C_4 + C_5 + C_6)$$
$$+ C_2(C_1 + C_9 + C_{10} + C_3 + C_4 + C_5 + C_6)$$
$$+ C_3(C_1 + C_2 + C_9 + C_{10} + C_4 + C_7 + C_8)$$
$$+ C_4(C_1 + C_2 + C_9 + C_{10} + C_3 + C_7 + C_8)$$
$$+ C_5(C_1 + C_2 + C_{11} + C_{12} + C_6 + C_7 + C_8)$$
$$+ C_6(C_1 + C_2 + C_{11} + C_{12} + C_5 + C_7 + C_8)$$
$$+ C_7(C_3 + C_4 + C_5 + C_6 + C_{11} + C_{12} + C_8)$$
$$+ C_8(C_3 + C_4 + C_5 + C_6 + C_{11} + C_{12} + C_7)$$

By analysis this formula states that a FIRE indication will be obtained while on the NORMAL switch position when typically $C_1$ and $C_2$ or $C_1$ and $C_9$ or $C_1$ and $C_{10}$, etc., detect and verify a fire. There are many obvious duplications in this formula and eliminating these duplications results in the following equation:

$$\text{FIRE}_N = \overline{C}_1(\overline{C}_2 + \overline{C}_4 + \overline{C}_6 + \overline{C}_9 + \overline{C}_{10})$$
$$+ \overline{C}_2(\overline{C}_3 + \overline{C}_6 + \overline{C}_9 + \overline{C}_{10})$$
$$+ \overline{C}_3(\overline{C}_8 + \overline{C}_1 + \overline{C}_4 + \overline{C}_9 + \overline{C}_{10})$$
$$+ \overline{C}_4(\overline{C}_2 + \overline{C}_7 + \overline{C}_9 + \overline{C}_{10})$$
$$+ \overline{C}_5(\overline{C}_1 + \overline{C}_2 + \overline{C}_6 + \overline{C}_{11} + \overline{C}_{12})$$
$$+ \overline{C}_6(\overline{C}_7 + \overline{C}_8 + \overline{C}_{11} + \overline{C}_{12})$$
$$+ \overline{C}_7(\overline{C}_3 + \overline{C}_5 + \overline{C}_8 + \overline{C}_{11} + \overline{C}_{12})$$
$$+ \overline{C}_8(\overline{C}_4 + \overline{C}_5 + \overline{C}_{11} + \overline{C}_{12})$$

The first of the two equations assumes a 1 input whereas there really is a 0 input or a $\overline{1}$. The second equation reflects a $\overline{1}$ requirement so that a 0 input means FIRE.

A more practical form of the equation for fabrication purposes is as follows:

$$\overline{\overline{C_1(\overline{C_2 C_4 C_6 C_9 C_{10}})} \overline{C_2(\overline{C_3 C_6 C_9 C_{10}})}}$$
$$\times \overline{\overline{C_3(\overline{C_1 C_4 C_8 C_9 C_{10}})} \overline{C_4(\overline{C_2 C_7 C_9 C_{10}})}}$$
$$\times \overline{\overline{C_5(\overline{C_1 C_2 C_6 C_{11} C_{12}})} \overline{C_6(\overline{C_7 C_8 C_{11} C_{12}})}}$$
$$\times \overline{\overline{C_7(\overline{C_3 C_5 C_8 C_{11} C_{12}})} \overline{C_8(\overline{C_4 C_5 C_{11} C_{12}})}}$$
$$= \text{FIRE}_N = 1$$

The equation is represented by the conventional computer building blocks N1, N2, N3, and N4. The blocks are shown in Part A. Part A and Part B are constructed so that two channels are compared by Part C and Part D, the FIRE detection and OVERHEAT detection, respectively.

Part C compares the output of the two N5 AND gates. A fire will cause an output of a 1 from the N5 AND gates. If two 1's are fed into Part C, the following occurs. First, and foremost, both channels agree, which indicates that it is remote that there is a failure in the system. Secondly they both see a fire. This condition is FIRE $\overline{\text{FAIL}}$, and thus N7 sends out a 0 and N8 sends out a 0. When the N5's both put out a 0, N7 puts out a 1 and N8 puts out a 0 which is $\overline{\text{FIRE}}\ \overline{\text{FAIL}}$. If the two channels disagree, N7 puts out a 1 and N8 puts out a 1 which means $\overline{\text{FIRE}}$ FAIL.

Blocks N9 and N10 in Part E perform this function. A computer mode chart based upon these equations is given in the following table.

COMBINATIONS OF SENSORS TO DETECT AND VERIFY FIRE OVERHEAT IN THE NORMAL MODE

| Detect | Verify | | | | | | | | | | | | Total combinations |
|---|---|---|---|---|---|---|---|---|---|---|---|---|---|
|  | UV1 | UV2 | UV3 | UV4 | IR1 | IR2 | IR3 | IR4 | C1 | C2 | C3 | C4 | |
| UV1 |  | F | F |  | F | F | F |  | F | F |  |  | 7 |
| UV2 | F |  |  | F | F | F |  | F | F | F |  |  | 6 |
| UV3 | F |  |  | F | F |  | F | F |  |  | F | F | 6 |
| UV4 |  | F | F |  |  | F | F | F |  |  | F | F | 5 |
| IR1 | F | F | F |  |  | F | F |  | F | F | F |  | 4 |
| IR2 | F | F |  | F | F |  |  |  | F | F | F |  | 3 |
| IR3 | F |  | F | F | F |  |  | F |  |  | F | F | 3 |
| IR4 |  | F | F | F |  | F | F |  |  |  | F | F | 2 |
| C1 |  |  |  |  |  |  |  |  |  | O |  |  | 1 |
| C2 |  |  |  |  |  |  |  |  | O |  |  |  | 1 |
| C3 |  |  |  |  |  |  |  |  |  |  |  | O | 1 |
| C4 |  |  |  |  |  |  |  |  |  |  | O |  | 1 |
|  |  |  |  |  |  |  |  |  |  |  |  |  | 40 |

F=fire; O=overheat.

For an indication of an overheat condition in the N position, the following equation was derived:

$$\overline{C_9 C_{10} C_{11} C_{12}} = 1 = \text{OVERHEAT}$$

This condition prevails for the E switch position (emergency) and the 0 switch position (OVERHEAT) also which simplifies the computer. The equation simply states that any single sensor can detect an overheat condition. The O1, O2, and O3 blocks in Part A perform this function. The comparator, Part D, is identical to Part C and performs the same function. The only difference is that the output is fed to the OVERHEAT lamp instead of the FIRE lamp.

So far the failure of the computer has been provided for but not the failure of the sensors.

The failure of two sensors in the center of a zone, two radiation sensors in the same housing or two overheat sensors in the same zone, constitutes a FAIL mode of the sensors. The logic equation for this condition is as follows:

$$\overline{A_1}\overline{A_2} + \overline{A_3}\overline{A_4} + \overline{A_5}\overline{A_6} + \overline{A_7}\overline{A_8} + \overline{A_9}\overline{A_{10}} + \overline{A_{11}}\overline{A_{12}} = 1 = \text{FAIL}$$

The alternate form used in the computer is $$\overline{(A_1 + A_2)(A_3 + A_4)(A_5 + A_6)(A_7 + A_8)} \\ \overline{(A_9 + A_{10})(A_{11} + A_{12})} = 1 = \text{FAIL}$$

The equations given so far assume that the push-to-test button has not been depressed and that the switch SW2 is in the NORMAL position. The output from SW2 provides a 1 which turns on only those elements associated with the NORMAL system while in the N position. For FAIL in the N position to occur as outlined in the previous equation, blocks N11, N12 FS1 must be used in Part H. The output of FS1 is fed into FS2. If a failure occurs in the system, one or both FS1's will put out a 1. The OR gate FS2 will allow either signal to send a 1 or $\overline{\text{FIRE}}$ signal to FS3 and a 1 or $\overline{\text{FAIL}}$ signal to T4. The system is basically fail-safe. The reason that a comparator such as Part C was not used in place of the OR gate in Part J (FS2) is that it is as important to read a failure in the fail-safe circuitry as it is to read a failure in the sensors.

If we wish to test the system for a failure, we need merely press the push-to-test button. This button switches both the FIRE and OVERHEAT lamps out of the circuitry and switches the FAIL and OK lamps in. The logic for the positive test is similar to the fail mode during normal operation without SW1 depressed.

The information derived for the OK and FAIL lights is given in the following equation ($\overline{\text{FAIL}}$=OK):

$$\overline{C_1 C_2} \ \overline{C_3 C_4} \ \overline{C_5 C_6} \ \overline{C_7 C_8} \ \overline{C_9 C_{10}} \ \overline{C_{11} C_{12}} = 1 = \text{FAIL}$$

(b) EMERGENCY mode (E)

To detect a fire in the E mode requires any single sensor to be allowed to detect the fire and verification is not required. The equation for detecting fire is $$\overline{C_1 C_2 C_3 C_4 C_5 C_6 C_7 C_8 C_9 C_{10}} = 1 = \text{FIRE}$$

The detection of an overheat is identical to that in the NORMAL system given previously. Fire detection in this mode is performed by E1 and E2 in Part A. An input to N5 provides the appropriate signal to the comparator, Part C.

The failure of four radiation sensors, two adjacent housings, or two overheat sensors in the same zone constitutes a system FAIL. The equation takes the following form:

$$(A_1 + A_2 + A_3 + A_4)(A_1 + A_2 + A_5 + A_6)(A_3 + A_4 + A_7 \\ + A_8)(A_5 + A_6 + A_7 + A_8)(A_9 + A_{10})(A_{11} + A_{12}) \\ = 1 = \text{FAIL}$$

Blocks E5 and E6 (Part H) provide input into FS1. If a failure occurs, E6 puts out a 1 which causes FS1 to put out a 1 or a FAIL signal to FS2 the OR gate. The reaction is then identical to the NORMAL system.

A push-to-test system requires that the system is operational as a whole and that numerous sensors can fail and not be of any problem. The equation for push-to-test failure is as follows:

$$\frac{\overline{C_1 C_2 C_3 C_4} \ \overline{C_5 C_6 C_7 C_8} \ \overline{C_9 C_{10}} \ \overline{C_{11} C_{12}} \ \overline{C_1 C_2 C_5 C_6}}{\overline{C_3 C_4 C_7 C_8}} = \text{FAIL} = 1$$

In Part E, E3 and E4 perform the basic function of the above equation. A 1 output from E4 results in a FAIL output of a 1 to T1.

(c) FIRE mode (UV)—Ultraviolet system

With Switch SW2 on position UV, the ultraviolet mode, fire is detected by the ultraviolet radiation detection system. When this system is operating, a single ultraviolet detecor can detect a fire, and a single sensor failure will be read out. For fire detection, the following equation holds true:

$$\overline{C_1 C_3 C_5 C_7} = \text{FIRE} = 1$$

This function is performed by U1 and its output is to N5 (Part A). No overheat detection is possible in this mode, only fire detection. During normal operation, the FAIL light would be activated using the following logic if a failure occurred in any of the sensors:

$$\overline{A_1 A_3 A_5 A_7} = \text{FAIL} = 1$$

Block U4 Part H performs this task. The push-to-test logic is also simple and is as follows:

$$C_1 + C_3 + C_5 + C_7 = \text{FAIL} = 1$$

Thus if UV1, or UV2, or UV3, or UV4 fail, a 1 will be input to U2 and in turn to U3, Part E. U3 must be turned on by switch position UV so that a NAND can be used. The inverter after the NAND allows for NAND circuitry instead of AND circuitry.

(d) FIRE mode (IR)—Infrared system

The fourth position on SW2 is to activate the infrared fire detection system. As with the ultraviolet system, overheat detection is not possible in this mode. The output from SW2 is a 1 which activates only the IR system. A fire can be detected if the same logic is used for infrared as was used with the ultraviolet system. Its form is $$\overline{C_2 C_4 C_6 C_8} = \text{FIRE} = 1$$

and it is performed by I, Part A. The failure logic likewise is identical for a sensor failure in both the ultraviolet and infrared mode and is as follows:

$$\overline{A_2 A_4 A_6 A_8} = \text{FAIL} = 1$$

Block I4, Part H, performs this requirement. The push-to-test to read FAIL is $$C_2 + C_4 + C_6 + C_8 = \text{FAIL} = 1$$

This function is provided by I2 and I3, Part E.

(e) OVERHEAT mode (C)—Continuous sensors

With SW2 in Position 5, only the overheat system using the continuous sensors can be used. Fire detection cannot be made by any direct means using this system. The equation for overheat detection is as follows:

$$\overline{C_9 C_{10} C_{11} C_{12}} = \text{OVERHEAT} = 1$$

Blocks O1, O2, and O3 Part A perform the function. A FAIL during normal operation requires both detectors in one zone to fail as indicated below:

$$(A_9 + A_{10})(A_{11} + A_{12}) = \text{FAIL} = 1$$

Blocks O9 and O10 provide this requirement in Part H.

The final push-to-test function for the computer is provided by O7 and O8 Part E and is defined by the following equation:

$$\overline{A_9 A_{10}} \ \overline{A_{11} A_{12}} = \text{FAIL} = 1$$

Although the basic requirements of the computer have now been defined, there are also other functions that provide for fail-safe and the readouts that require analysis.

The comparators Part C and Part D have previously been analyzed, but Part G and Part J have not.

Part G comprised of an AND gate and inverter provides the FAIL, OK signal from Part E and Part F. Part E and Part F are basically the push-to-test function of the computer. If both Parts E and F put a 1 into the AND gate T3, a 1 will come out of T3 and light the OK light. The concept of $\overline{\text{FAIL}}$ is used for OK. If either Part E or Part F does not cause a 1 input into T3, a 0 will go to the OK light which will not light it, and the inverter after T3 will send a 1 to activate the FAIL light. Obviously if both E and F indicate a FAIL, a 0, the FAIL light will be activated and the OK light will not. It must be remembered that this is a push-to-test function whose fundamental job it is to detect a system failure so that false warnings cannot go undetected during routine operation.

Part J, an OR gate labeled FS2, is the fail-safe gate that provides a FAIL light during routine operation. Part H and Part I detect directly and continuously any failure of a sensor during routine operation. Since FAIL is of maximum importance, a failure signal from either H or I must activate the FAIL light. Thus a 1 from either of the FS1's will be input to FS2 and transferred as a 1 to both FS3 for FIRE and T4 for FAIL. A 1 at FS3 provides a 0 or nonactivating signal to the FIRE light. The T4 OR gate, however, transfers the 1 to the FAIL light which turns it on. The only signal that will provide FIRE is a 0 output from both FS1's.

The circuit elements FS3, D7, and T4 are the precedence circuits. The order of precedence circuits was previously established as FAIL, FIRE, and OVERHEAT. As shown in the preceding paragraphs, FAIL takes precedence over FIRE. Now the precedence circuit for FIRE over OVERHEAT will be shown. If D7 receives a 0 from Part D, there must be a 0 input from FS3 in order to provide a 1 or activating signal to the driver of the OVERHEAT light. If overheat occurs and then a fire, the output from FS3 will be a 1 input to D7 which will not allow the OVERHEAT light to be activated. Thus the precedence of FIRE over OVERHEAT is established.

The equations describing the push-to-test function of the fire systems N, E, UV, IR and C state only that a FAIL indication will be given. When a FAIL indication does not occur, a $\overline{\text{FAIL}}$ condition does. A $\overline{\text{FAIL}}$ is by definition OK, and so the OK light is activated.

It is to be understood that the foregoing embodiment described in detail of this invention is not to be considered limiting. For instance the arbitrary direct current voltages of 10 volts for OK, 5 volts for FIRE or OVERHEAT, and zero volts for FAIL, may readily be changed to other values of voltages to represent these conditions. Likewise other types of ultraviolet, infrared, and continuous element heat sensors such as photoconductive and resistive may be used with appropriate changes in the sensor detection circuitry to provide outputs representative of the three foregoing enumerated conditions. Those persons skilled in the art of Boolean algebra and computer logic will readily understand the changes that can be made in the computer elements without departing from the overall logic of the system; such as the substitution of AND and OR circuits with complete inversion as set forth by DeMorgan's theorem, which may be stated briefly, $A \cdot B = x$ is the same as $\overline{A} + \overline{B} = \overline{x}$.

I claim:

1. A fire, overheat, and system condition, indicating system for engine nacelles of manned flight vehicles comprising:
   (a) infrared sensing means responsive to the conditions of fire in an engine nacelle and providing an electrical output indicative of the conditions of FIRE, FAIL, and OK;
   (b) ultraviolet sensing means responsive to the conditions of fire in the said engine nacelle and providing an electrical output indicative of the conditions of FIRE, FAIL, and OK;
   (c) continuous electrical heat sensing means responsive to the conditions of overheat in the said engine nacelle and providing an electrical output indicative of the conditions of OVERHEAT, FAIL, and OK;
   (d) trinary to binary converting means in one-to-one correspondence with each of the said sensing means, cooperating respectively therewith, for converting the indications of the three indicated conditions of each sensing means to an output in binary logic functions;
   (e) computing means operating in binray functions cooperating with the said converting means for comparing the said outputs of the said converting means and providing an electrical output; and
   (f) indicating means responsive to the output of the said computing means for providing indications of FIRE, OVERHEAT, and FAIL.

2. An indicating system for indicating the conditions of fire and overheat in an engine nacelle of a manned flight vehicle, and the condition of OK or FAIL of the indicating system, the said system comprising:
  (a) a plurality of infrared photovoltaic sensing means, positioned within the engine nacelle in spaced relationship essentially around the engine, responsive optically to condition of an engine fire;
  (b) a first plurality of electrical systems in one-to-one correspondence with each of the said infrared photovoltaic sensing means and responsive thereto for providing voltage indications of engine fire, sensing means failure, and sensing means OK;
  (c) a plurality of ultraviolet photovoltaic sensing means, positioned in the engine nacelle in spaced relationship essentially around the engine, responsive optically to the conditions of an engine fire;
  (d) a second plurality of electrical systems in one-to-one correspondence with each of the said ultraviolet sensing means and responsive thereto, for providing voltage indications of engine fire, sensing means failure and sensing means OK;
  (e) a plurality of continuous element thermopile heat sensing means, positioned within the engine nacelle, responsive to the condition of engine overheat;
  (f) a third plurality of electrical systems in one-to-one correspondence with the heat sensing means and responsive thereto, for providing voltage indications of engine overheat, sensing means failure, and sensing means OK;
  (g) a plurality of trinary to binary converting means in one-to-one correspondence with each of the said electrical systems and responsive thereto, for converting each of the said three voltage indications from each electrical system to a respective output in binary function;
  (h) two channel comparison, binary function, computing means having manually selectable modes of NORMAL, EMERGENCY, FIRE ULTRAVIOLET, FIRE INFRARED, CONTINUOUS SENSOR OVERHEAT, for comparing, testing, and selecting the outputs of the said plurality of converting means, and providing an electrical output; and
  (i) readout means including a manually activated test switch for providing the readout indications of FIRE, FAIL, OVERHEAT, and OK.

3. The indicating system as claimed in claim 2 wherein the said indication of OK is responsive only when the said test switch is activated.

4. The indicating system as claimed in claim 3 wherein the order of precedence of the said readout indications are respectively FAIL, FIRE, and OVERHEAT.

References Cited

UNITED STATES PATENTS

| | | | |
|---|---|---|---|
| 3,380,045 | 4/1968 | Lindberg | 340—227 |
| 3,417,392 | 12/1968 | Hansen et al. | 340—227 |

KATHLEEN H. CLAFFY, Primary Examiner

J. S. BLACK, Assistant Examiner

U.S. Cl. X.R.

340—27